United States Patent [19]

Mun

[11] Patent Number: 5,579,221
[45] Date of Patent: Nov. 26, 1996

[54] HOME AUTOMATION SYSTEM HAVING USER CONTROLLED DEFINITION FUNCTION

[75] Inventor: Yong-Soon Mun, Euiwang, Rep. of Korea

[73] Assignee: SamSung Electronics Co., Ltd., Suwon, Rep. of Korea

[21] Appl. No.: 366,558

[22] Filed: Dec. 30, 1994

[30] Foreign Application Priority Data

Dec. 31, 1993 [KR] Rep. of Korea ................ 31795/1993

[51] Int. Cl.$^6$ ................................................ G05B 19/42
[52] U.S. Cl. ........................ 364/188; 364/146; 340/825.37
[58] Field of Search ................................. 364/188–190, 364/140–146; 340/286.01, 286.02, 825.06, 701, 703, 310 R, 286.06, 825.37

[56] References Cited

U.S. PATENT DOCUMENTS

| | | |
|---|---|---|
| 4,567,557 | 1/1986 | Burns et al. . |
| 4,665,544 | 5/1987 | Honda et al. . |
| 4,728,949 | 3/1988 | Platte et al. . |
| 4,755,792 | 7/1988 | Pezzolo et al. . |
| 4,772,870 | 9/1988 | Reyes . |
| 4,829,560 | 5/1989 | Evanyk et al. . |
| 4,835,372 | 5/1989 | Gombrich et al. . |
| 4,847,782 | 7/1989 | Brown, Jr. et al. . |
| 4,899,217 | 2/1990 | MacFedyen et al. . |
| 4,959,713 | 9/1990 | Morotomi et al. . |
| 4,989,081 | 1/1991 | Miyagawa et al. . |
| 5,033,112 | 7/1991 | Bowling et al. . |
| 5,086,385 | 2/1992 | Launey et al. . |
| 5,089,974 | 2/1992 | Demeyer . |
| 5,127,045 | 6/1992 | Cragon et al. ........................ 379/88 |
| 5,227,762 | 7/1993 | Guidette et al. . |
| 5,237,305 | 8/1993 | Ishikuro . |
| 5,293,476 | 3/1994 | Wolber et al. . |
| 5,351,272 | 9/1994 | Abraham . |

*Primary Examiner*—Roy N. Envall, Jr.
*Assistant Examiner*—Thomas E. Brown
*Attorney, Agent, or Firm*—Robert E. Bushnell, Esq.

[57] ABSTRACT

A home automation system having a user controlled definition function is operated in response to input of an inherent call code. The system includes power line controller PLC modules for switching power to appliances connected thereto in response to receipt of a control code; monitoring devices for displaying input video information; a video display processing device having a font memory and a video memory for assessing font data corresponding to a character code received from the font memory in response to receipt of the character code and for providing a video signal corresponding to the assessed font data to the monitoring device; a control device for providing to the video display processing device character code corresponding to a user defined number, device name, call code, and control code in response to a set user defined function; the control device also stores the user defined number, the call code, and the control code in an address region corresponding to the user defined number, and transmits the call code and control code in response to input of the user defined number; and an interfacing device for transmitting the call code and control code output from the control device to the power line controller PLC modules.

14 Claims, 4 Drawing Sheets

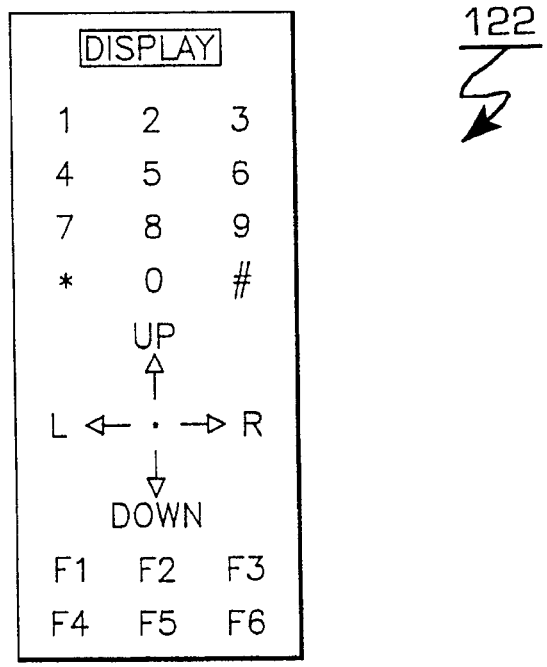
FIG. 4
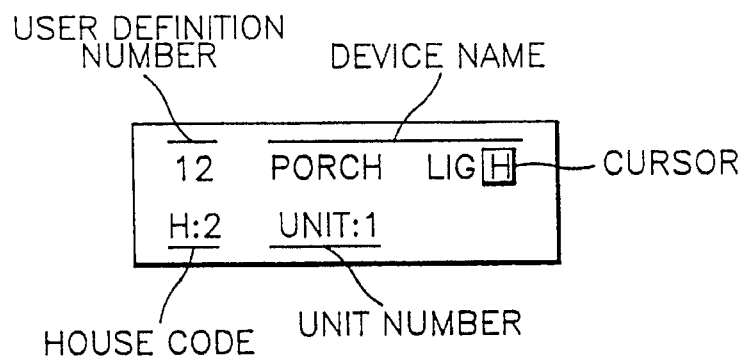
FIG. 6
FIG. 7

HOME AUTOMATION SYSTEM HAVING USER CONTROLLED DEFINITION FUNCTION

CROSS-REFERENCE TO RELATED APPLICATIONS

This application makes reference to, incorporates herein and claims all benefits accruing from our application earlier filed in the Korean Industrial Property Office 31 Dec. 1993 of our application entitled HOME AUTOMATION SYSTEM HAVING USER CONTROL DEFINITION FUNCTION, which application was duly assigned Ser. No. 31795/1993.

BACKGROUND OF THE INVENTION

The present invention relates to a home automation system (HAS) for automatically executing operations in the home. The system includes a computer for analyzing information corresponding to a particular control status and a monitor for displaying such information. More particularly, the present invention relates to a home automation system having a user controlled definition function capable of providing an easy-to-use graphic user interface (GUI) between a user and the home automation system, so that the user can define and set each control status.

Generally, home automation systems (HAS) include all systems that control communication terminals or electrical appliances in the home and have a security function for maintaining proper safety in the home. Such home automation systems typically analyze a current control status by evaluating outputs from a wide variety of sensors, generate a warning signal corresponding to the status and then control electrical appliances in response to the user's control. Furthermore, conventional home automation systems display the control and security status of the electrical appliances on a provided monitor where it can be controlled in accordance with the user's inputs.

One such conventional home automation system is disclosed in U.S. Pat. No. 5,086,385 entitled *Expandable Home Automation System* issued on Feb. 4, 1992 to Launey et al. This patent discloses a graphic user interface and a control circuit in which a user is capable of performing a desired operation after selecting appliances to be controlled on a monitor. That is, Launey et al. '385 provides a system capable of checking the status of various kinds of electrical appliances and the state of security in the home using the monitor. The electrical appliances displayed are selected using a cursor or a mouse, thus allowing the operation of corresponding electrical appliances to be controlled.

The home automation system disclosed in Launey et al. '385, however, only displays previously stored graphic information and then performs designated functions. Accordingly, there are disadvantages in that names for electrical appliances to be controlled can not be defined by the user and sequential control of a plurality of electrical appliances can not be performed.

Another conventional home automation system is disclosed in U.S. Pat. No. 4,989,081 entitled *Home—Bus— Information System* issued to Miyagawa et al. on 29 Jan. 1991. In this invention, a home-bus-information display system is arranged such that the control status of each of a plurality of home appliances can be monitored and displayed to allow a viewer to evaluate the control status of each of the appliances. While this invention provides a user with centralized control over designated appliances, it fails to provide the user with the ability to select names for the appliances and sequentially control the appliances. Accordingly, we believe that this system can be improved.

A more recent effort towards home automation is disclosed in U.S. Pat. No. 5,237,305 entitled *Home Bus System* issued to Ishikuro et al. on 17 Aug. 1993. This system enables monitoring and control of electrical appliances through the use of various sensors. Emergencies and irregular conditions concerning the appliances are sensed by the sensors and appear on the screen of a visual controller in the form of pictographs. Data regarding these pictographs are stored in a memory, and once stored are read from the memory and displayed on the screen to alert the user of a particular condition. While this invention provides users with an adequate monitoring system, we again recognize that it fails to provide the user with the ability to select names for the appliances and sequentially control the appliances.

SUMMARY OF THE INVENTION

Therefore, it is an object of the present invention to provide an improved home automation system.

It is another object to provide a home automation system in which a user is capable of directly defining names of electrical appliances to be operated according to a code.

It is still another object to provide a home automation system in which a user is capable of controlling electrical appliances whose names are defined by corresponding codes.

It is yet another object to provide a home automation system in which one or more electrical appliances defined by a user can be controlled sequentially.

It is still yet another object to provide a home automation system in which a plurality of electrical appliances defined by a user can be controlled at a preset time by using one-touch operation.

It is a further object to provide a home automation system in which electrical appliances can be controlled by using a power line controller (PLC).

These and other objects can be achieved according to the principles of the present invention with a home automation system having a user controlled definition function operated in response to input of an inherent call code. The system includes power line controller PLC modules for switching power to appliances connected thereto in response to receipt of a control code; monitoring devices for displaying input video information; a video display processing device having a font memory and a video memory for assessing font data corresponding to a character code received from the font memory in response to receipt of the character code and for providing a video signal corresponding to the assessed font data to the monitoring device; a control device for providing to the video display processing device character code corresponding to a user defined number, device name, call code, and control code in response to a set user defined function; the control device also stores the user defined number, the call code, and the control code in an address region corresponding to the user defined number, and transmits the call code and control code in response to input of the User defined number; and an interfacing device for transmitting the call code and control code output from the control device to the power line controller PLC modules.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a view illustrating key arrangements on a remote controller constructed according to the principles of the present invention;

FIGS. 6 and 7 are views illustrating examples of the user controlled definition function displayed on a monitor according to the principles of the present invention.

DETAILED DESCRIPTION OF THE PREFERRED EMBODIMENTS

Figure 1:
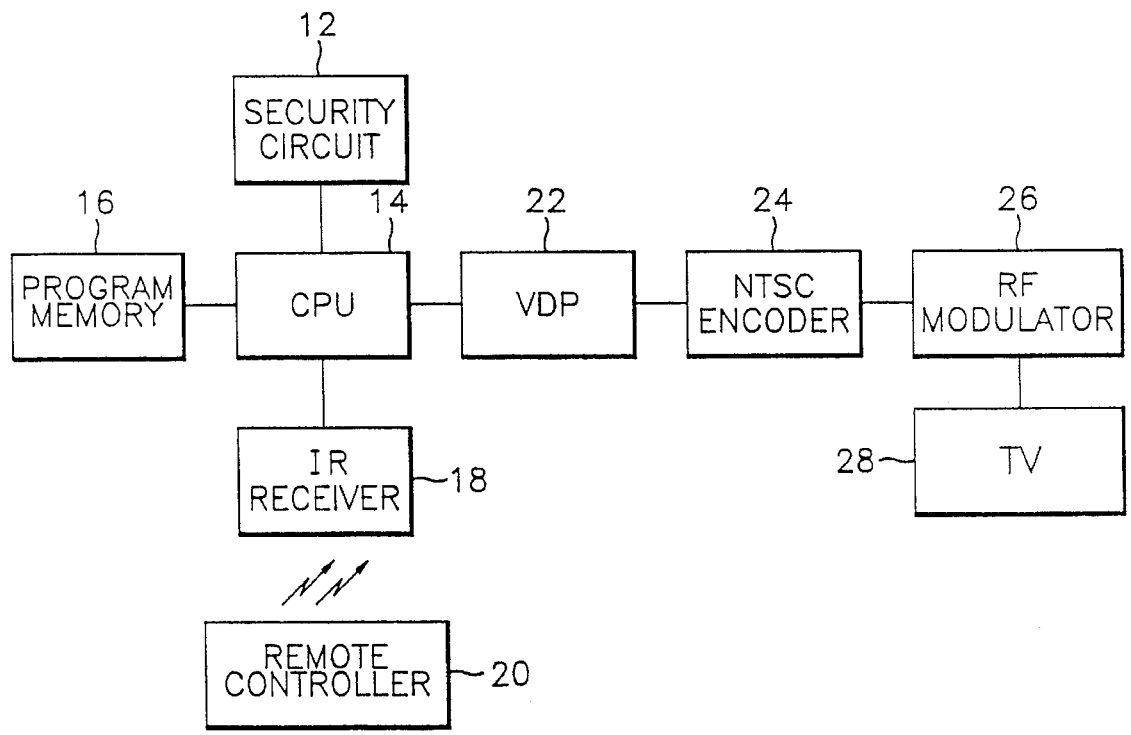
FIG. 1 is a block diagram illustrating a conventional home automation system.

FIG. 1 is a block diagram illustrating a conventional home automation system. The system includes a monitor 28 for displaying a control status, and a central processing unit CPU 14 for managing system operations. A television set TV 28 used in the home is shown as the system monitor.

In the home automation system of FIG. 1, various types of security information is output from a security circuit 12 and supplied to central processing unit CPU 14. Security circuit 12, which includes various types of sensors, supplies corresponding security information to central processing unit CPU 14 when an unexpected status arises. The various sensors such as, for example, a gas sensor, a vibration sensor, etc, generate various sensing signals to provide a security function. In response, central processing unit CPU 14 analyzes the current status in view of the supplied security information.

Central processing unit CPU 14, which receives various sensing signals from security circuit 12, processes the received signals in accordance with a predetermined program, and drives a warning circuit (not shown) for generating a warning signal corresponding to the received signals. Central processing unit CPU 14 then stores the received sensing information in an internal memory.

Central processing unit CPU 14 periodically reads an output from an infrared IR receiver 18 according to a constant time period and detects whether control information has been input from a remote controller 20. The control information received from remote controller 20 may confirm control information for detected types of sensing information and control information of electrical appliances connected to security circuit 12.

For example, if control information regarding the electrical appliances is generated from remote controller 20 and supplied to central processing unit CPU 14 through infrared IR receiver 18, central processing unit CPU 14 analyzes the supplied information and accesses corresponding graphical control information from a program memory 16. Central processing unit CPU 14 then transmits the accessed graphical control information to a video display processor VDP 22.

The graphical control information stored in program memory 16 is made up of text information and graphical information for the electrical appliances corresponding to control objects. Such information provides a user with a relatively easy method for selecting electrical appliances to be controlled.

Video display processor VDP 22 processes the graphical control information received from central processing unit CPU 14, adds vertical and horizontal synchronization signals and red, green and blue (i.e. R, G, B) signals for compatibility with a NTSC television system, and then transmits the graphical control information with the added synchronization and color signals to an input terminal of an NTSC encoder 24.

NTSC encoder 24 encodes the graphical control information with added synchronization and color signals and transmits encoded graphical control information to a radio frequency RF modulator 26, as a base-band composite video signal in compliance with a NTSC television system. That is, NTSC encoder 24 outputs a composite video signal to a radio frequency RF modulator 26 in which synchronous, chrominance and luminance signals are positioned in accordance with each of their respective frequencies.

Radio frequency RF modulator 26 modulates the received composite video signal (for example, a band frequency corresponding to channel number three or four) of a specific channel band of television TV 28 connected to its own output terminal and then provides the modulated signal to an input terminal (for example, a tuner) within television TV 28. If the tuner of television TV 28 is selected to indicate channel number three or four, the composite video signal output from NTSC encoder 24 is displayed on a display region of television TV 28.

Figure 2:
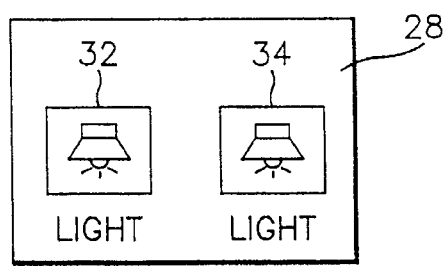
FIG. 2 illustrates a graphical display on the monitor shown in FIG. 1.

Referring now to FIG. 2, a graphical representation is displayed on the display region of television TV 28. In FIG. 2, when a user who desires to control electric lights selects a light control key with remote controller 20, central processing unit CPU 14 responds to the light control key and reads graphical information regarding light from program memory 16, thereby outputting this information to video display processor VDP 22. Accordingly, the graphical information regarding light is displayed as illustrated in FIG. 2.

When the graphical information illustrated in FIG. 2 is displayed on television TV 28, if the user inputs control information to remote controller 20 indicating that a light represented by first light icon 32 should be turned "ON", central processing unit CPU 14 responds to the input information by driving the light represented by first light icon 32 through security circuit 12. Also, central processing unit CPU 14 controls video display processor VDP 22 so that the color or illumination of first light icon 32 is changed, while the display of a second light icon 34 remains unchanged.

With the conventional home automation system, however, since only the graphic information and characters previously masked in program memory 16 are displayed, there is a disadvantage in that names or designations for electrical appliances to be controlled by the user can not be defined. Also, there is a disadvantage in that sequential control for two or more electrical appliances can not be performed using a single key.

Figure 3:
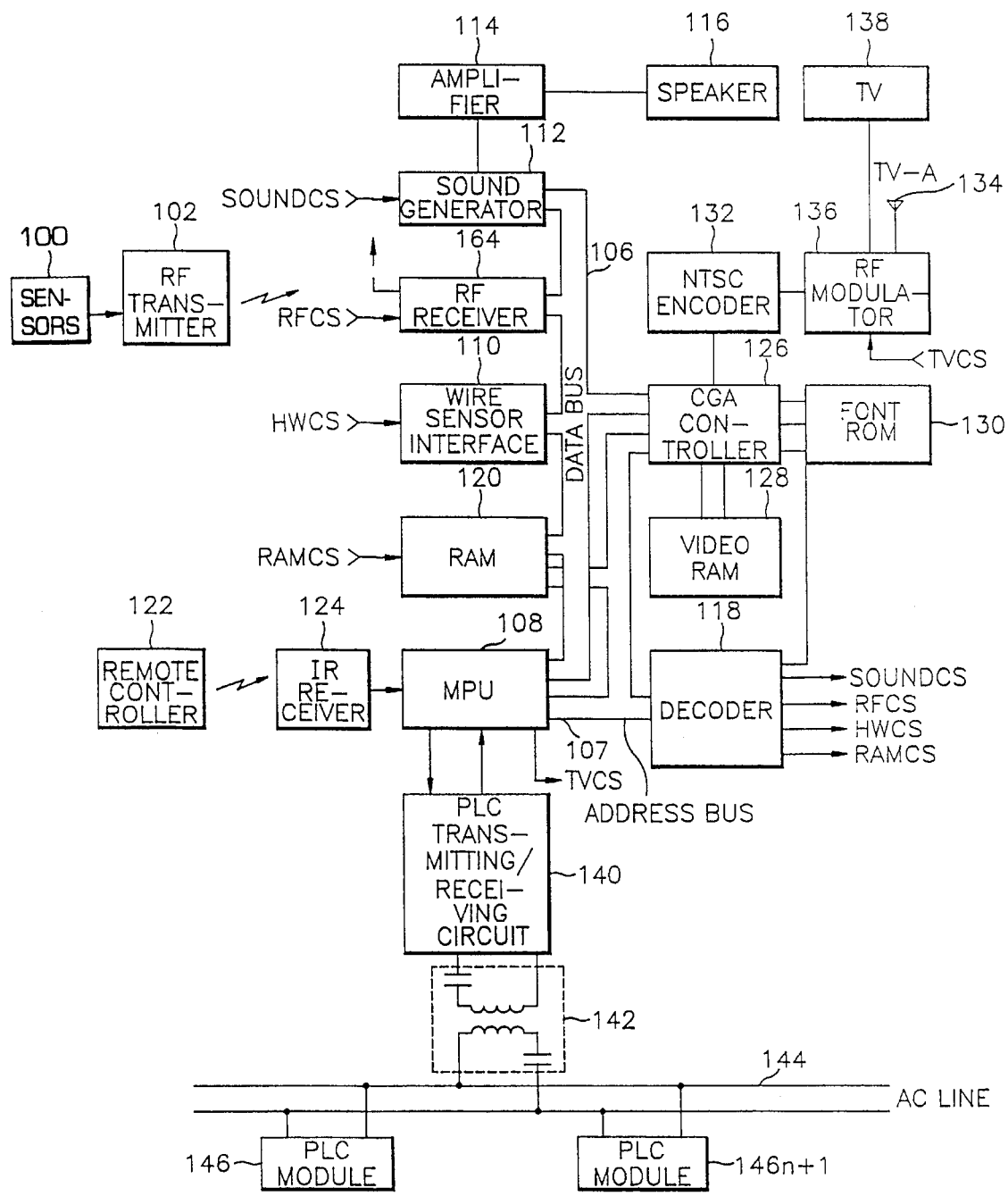
FIG. 3 is a block diagram illustrating the home automation system having a user controlled definition function constructed according to the principles of the present invention.

Referring now to FIG. 3, a block diagram of the home automation system having a user controlled definition function constructed according to the principles of the present invention is illustrated. In FIG. 3, a configuration is provided in which names or designations for particular electrical appliances are defined by a user and defined functions of the applicances are thereby performed.

FIG. 4 is an exemplary arrangement of keys on a remote controller 122 constructed according to the principles of the present invention. Remote controller 122, like conventional remote controllers, transmits infrared rays corresponding to key depressions. The key arrangements of remote controller 122 are as follows. A display key controls a radio frequency RF modulator 136 (see FIG. 3). If the display key is selected, a microprocessor unit MPU 108 outputs a monitor control signal TVCS to radio frequency RF modulator 136. In response to monitor control signal TVCS, radio frequency RF modulator 136 terminates reception of signals from an antenna 134 and simultaneously supplies a signal output from an NTSC encoder 132 to a television TV 138. Numeric keys 0 through 9 are used when a figure is input. A "*" key is used when a defined value for an appliance is selected and stored. A "#" key is a cancel key used to cancel all key values input up to that point, or to recover a previous screen. Keys UP(Δ), DOWN(∇), RIGHT(), and LEFT() are used to manuever a cursor. When these keys are selected, the cursor displayed on television TV 138 moves in the selected directions. Microprocessor unit MPU 108 controls the movement of the cursor; and keys F1 to F6 are function keys, each of which enables performance of one or more control functions by one touch control.

Figure 5:
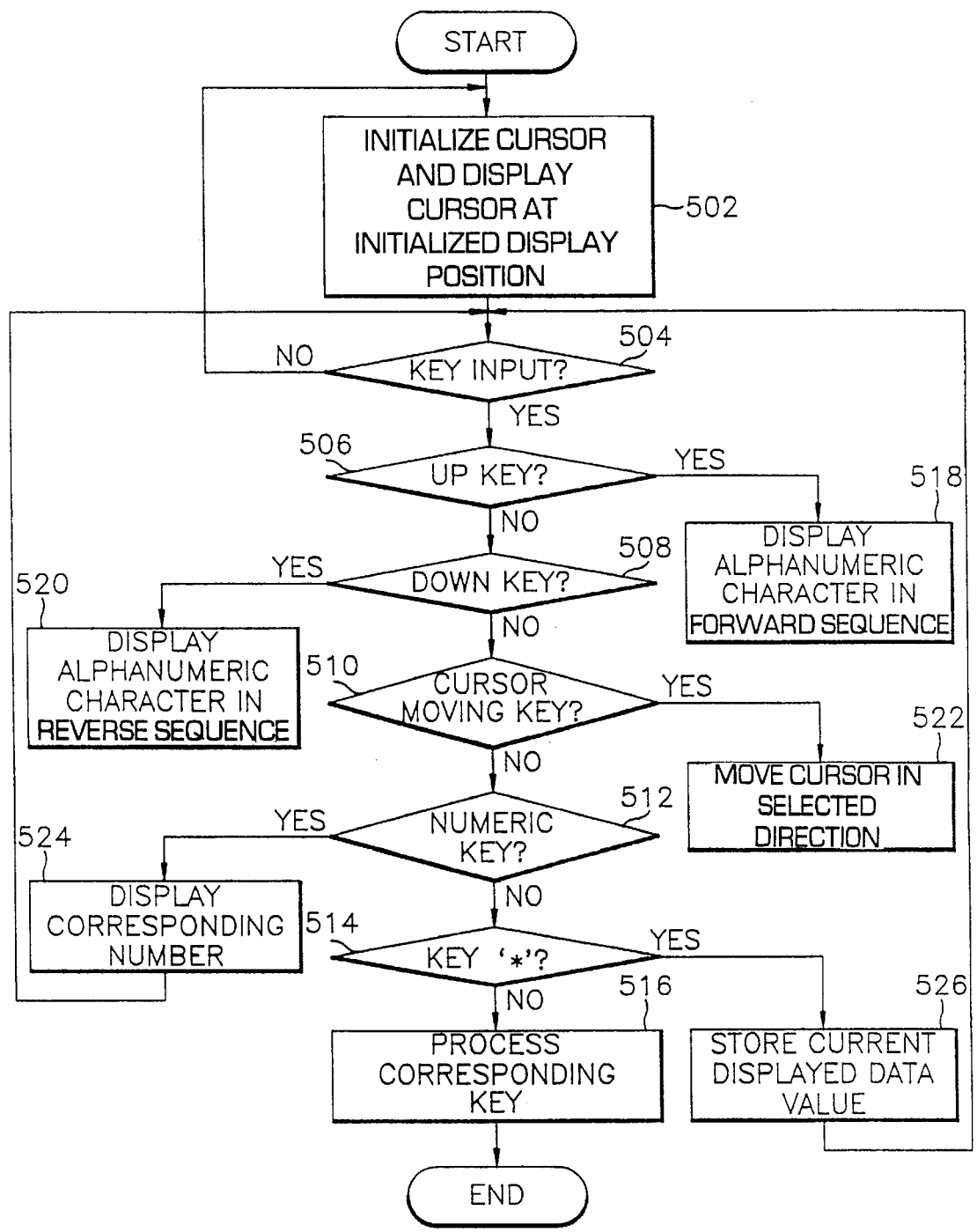
FIG. 5 is a flow chart illustrating a process for setting the user controlled definition function according to the principles of the present invention.

FIG. 5 is a flow chart illustrating a process for setting the user controlled definition function according to the principles of the present invention. In FIG. 5, there is provided a process for initializing and displaying the position of the cursor on the monitor, displaying a corresponding character or numeral at the cursor's position in response to a key signal from remote controller 122 shown in FIG. 3 while-simultaneously shifting the cursor, and storing data in a memory in response to an input of a storing key.

FIGS. 6 and 7 are views illustrating examples of the user controlled definition function displayed on a monitor according to the principles of the present invention.

Explanations regarding a security operation, the setting of a user defined function, and processes for control operations according to the present invention will hereinafter be described in detail.

When the circuit shown in FIG. 3 operates, a radio frequency RF transmitter 102 scans outputs of one or more sensors (generically depicted as reference numeral 100) and determines whether an abnormal signal is generated from any of the sensors. If an abnormal signal (i.e. a security signal) is generated from any one of the sensors, radio frequency RF transmitter 102 responds to the security signal by generating data having a system code, a channel code, and a secret code indicative of the abnormal signal, and modulating the data to thereby transmit the modulated data as radio signals. The signals transmitted from radio frequency RF transmitter 102 are received by a radio frequency RF receiver 164. The sensors connected to radio frequency RF transmitter 102 are remotely positioned. In situations where the sensors are positioned in a plurality of locations, it is important that the sensors be spaced apart adequately in order to accurately establish identification of the sensors.

Microprocessor unit MPU 108 shown in FIG. 3 outputs first, second, third and fourth addresses to an address bus 107, according to a predetermined period. An address signal of address bus 107 is transmitted to input terminals .of a random access memory RAM 120, a color graphic adapter CGA controller 126 and a decoder 118. Here, the first, second, third and fourth addresses refer to addresses where first, second, third and fourth enable signals RFCS, HWCS, SOUNDCS and RAMCS will be output from decoder 118.

When one of the first, second, third and fourth addresses is supplied to decoder 118, decoder 118 outputs one of the first, second, third and fourth enable signals RFCS, HWCS, SOUNDCS and RAMCS in correspondence with the input address. Thus, if microprocessor unit MPU 108 sequentially outputs the first through fourth addresses, according to a predetermined period, decoder 118 decodes the input addresses and sequentially outputs the first, second, third and fourth enable signals RFCS, HWCS, SOUNDCS and RAMCS.

Radio frequency RF receiver 164 responds to first enable signal RFCS output from decoder 118 and receives a sensing status (i.e. a security signal radio-transmitted from radio frequency RF transmitter 102). Then, radio frequency RF receiver 164 demodulates the received security signal as a code, analyzes the demodulated code, and detects whether the demodulated code is consistent with its own system code. If radio frequency RF receiver 164 determines that a system code indicated by the received code is consistent with its own system code, radio frequency RF receiver 164 transmits the received code, to an input terminal of microprocessor unit MPU 108 via a data bus 106.

A wire sensor interface 110 responds to second enable signal HWCS output from decoder 118 by scanning outputs of sensors (not shown) to which it is connected by a wire line. If a line security signal from the sensors is generated, wire sensor interface 110 transmits the system code and channel code corresponding to the received security signal to microprocessor unit MPU 108 via data bus 106. If the sensors connected to radio frequency RF transmitter 102 and wire sensor interface 110 supply switching points, the same kind of sensors can be used.

As a result, microprocessor unit MPU 108 analyzes the system codes and channel codes received from radio frequency RF transmitter 102 and from wire sensor interface 110, thereby recognizing a preset security status; for example, a fire, a gas leak, a home break-in, etc. In order to generate an audible warning corresponding to the security status, microprocessor unit MPU 108 outputs a corresponding warning control signal to a warning sound generator 112 via data bus 106, and outputs to decoder 118 an address signal for generating third enable signal SOUNDCS.

Warning sound generator 112 responds to third enable signal SOUNDCS output from decoder 118 by transmitting an audible warning signal corresponding to the warning control signal to an input terminal of an amplifier 114. The audible warning signal may be a siren signal having a different tone or cadence in accordance with the security status, or may be a voice signal. If the audible warning is output as a voice signal, warning sound generator 112 must store digital voice data corresponding to the particular status and voice-synthesize the digital voice data.

Amplifier 114 amplifies the received audible warning signal to a given level, and the amplified audible warning signal is then output to a speaker 116 connected to an output terminal of amplifier 114 where it is converted and output as an audible sound. Accordingly, when a security status is generated, an audible warning signal corresponding to the security status is output from speaker 116.

Microprocessor unit MPU 108 also transmits an address signal to decoder 118 via address bus 107 to generate fourth enable signal RAMCS. At the same time, microprocessor unit MPU 108 outputs security status information to data bus 106. When fourth enable signal RAMCS is output from decoder 118, random access memory RAM 120 is operated to store the security status information input from data bus 106 in an address location specified by the address signal input from address bus 107. This storage operation allows the user to easily recognize the status types when a status screen is displayed on television TV 138.

When a security status is generated from among the various sensors by a series of control operations as set forth above, a corresponding audible warning is generated and random access memory RAM 120 stores the corresponding security status information.

The term "user defined function" or "user controlled definition function" in the present invention means that users can define the names or designations for devices such as electrical appliances (i.e. lights, motors, mixers, etc.) connected to power line controller PLC modules 146 and 146n+1 shown in FIG. 3, and also program these devices to control their on/off operations.

Each of the power line controller PLC modules 146 and 146n+1 of FIG. 3 has an associated house code and unit code. The house code refers to an inherent household number, and the unit code refers to a power line controller PLC module unit number. These codes are set by a dual-in-line DIP switch installed on the interior of power line controller PLC modules 146 and 146n+1. Each of the power line controller PLC modules 146 and 146n+1 has a house code and a unit code set by the user, and also has a predetermined control code. Upon receipt of the applicable house code and unit code, power line controller PLC modules 146 and 146n+1 receive power from an alternating current AC power source line 144 in accordance with the received control code. The control code refers to a code that causes the electrical appliances connected to power line controller PLC modules 146 and 146n+1 to be turned on and off.

For a user to define the house and unit codes for power line controller PLC modules 146 and 146n+1, the user must first, using remote controller 122, set the operating mode of a CGA controller 126 connected to microcontroller unit MPU 108 to a text mode. While setting CGA controller 126 to the text mode, when control information is input to remote controller 122, the control information is transmitted to microprocessor unit MPU 108. Microprocessor unit MPU 108 responds to the input control information by outputting input/output command control data to CGA controller 126 through address bus 107 and data bus 106. This designates the operating mode of CGA controller 126 as the text mode. That is, the input/output command control data is input to a control register within CGA controller 126. Accordingly, CGA controller 126 operates in the text mode pursuant to control from microprocessor unit MPU 108.

With the present invention, when CGA controller 126 operates in the text mode, microprocessor unit MPU 108 operates in a user defined function mode. That is, microprocessor unit MPU 108 outputs cursor control data to CGA controller 126 to initialize the display position of the cursor and to display the cursor in the initialized position, as shown in step 502 of FIG. 5. Microprocessor unit MPU 108 then detects whether a key input is entered in step 504, by reading the output of infrared IR receiver 124 connected to the input terminal of microprocessor unit MPU 108.

In response to the cursor control data output from microprocessor unit MPU 108, CGA controller 126 outputs red, green and blue (R, G, B) video signals and a composite synchronous signal to NTSC encoder 132 to enable display of the cursor at the initialized display position. NTSC encoder 132 encodes the R, G, B video signals and composite synchronous signal and outputs a composite video signal to radio frequency RF modulator 136. In response to fifth enable signal TVCS output from microprocessor unit MPU 108, radio frequency RF modulator 136 modulates the output of NTSC encoder 132 as a signal for a preset channel (for example, channel number three or four) and outputs the modulated signal to the tuner of television TV 138. If the tuner of television TV 138 is set to channel number four, the cursor is displayed on television TV 138. When the display key on remote controller 122 is selected and received by microprocessor unit MPU 108, which receives the display key input through infrared IR receiver 124, fifth enable signal TVCS is output.

When the cursor is displayed on television TV 138, if the user inputs a user defined number, device name, control code, house code, and unit code in sequential order and then selects a storing key, microprocessor unit MPU 108 displays a series of input texts on television TV 138 and simultaneously stores the device name, control code, house code and unit code in an address region designated by the user defined number. Here, the user defined number, which is set at the user's option, refers to an address region where the control data is stored for the control of power line controller PLC modules 146 and 146n+1.

The operations discussed above will now be described in detail with reference to FIG. 5.

If key information is output as an infrared signal from remote controller 122, infrared IR receiver 124 receives the infrared signal, converts the received infrared signal to a digital signal, and outputs the digital signal to the input terminal of microprocessor unit MPU 108. At this time, microprocessor MPU 108 determines that the key input has been made in step 504, and then analyzes the input key status in steps 506 to 514.

If a numeric key is input in the key analysis steps 506 to 514, microprocessor unit MPU 108 transmits ASCII code corresponding to the input numeric key to CGA controller 126 and simultaneously stores the ASCII code in an internal temporary storage region. At this time, CGA controller 126 reads character font data corresponding to the ASCII code of the received numeric key from a font read only memory ROM 130 and then records the character font data in a video RAM 128. Furthermore, CGA controller 126 reads video data recorded in video RAM 128 with a predetermined period and outputs the video data as R, G, B video signals and a composite synchronous signal to NTSC encoder 132. NTSC encoder 132 encodes the input R, G, B video signals and composite synchronous signal and outputs a composite video signal to radio frequency RF modulator 136. Therefore, when the user defined number is input so that the user defined function can be set, the user defined number is displayed on television TV 138 and is simultaneously stored in the temporary storage region. Microprocessor unit MPU 108, after performing the above described operation, repeatedly executes the operation of step 504.

To define the device name in the region of the user defined number, if the UP or DOWN keys on remote controller 122, as shown in FIG. 4, are selected, the UP or DOWN key information is supplied to the input terminal of microprocessor unit MPU 108, as earlier discussed.

During this time, microprocessor MPU 108 analyzes the input key status in steps 506 to 514 and, if microprocessor unit MPU 108 determines that the input key is an UP key which moves the cursor upwardly, microprocessor unit MPU 108 transmits a next sequential alphanumeric ASCII code to CGA controller 126 in step 518. For instance, when the UP key is consecutively pressed, the ASCII code of characters from A to Z are output sequentially. During this output process, if the key input is stopped, the ASCII code of the character output at that corresponding point is stored in the internal temporary storage region of microprocessor unit MPU 108. At this time, CGA controller 126 reads character font data corresponding to the ASCII code of the received character and then records the data in video RAM 128. CGA controller 126 also reads video data recorded in video RAM 128 with a predetermined period and outputs the data as R, G, B video signals and a composite synchronous signal to NTSC encoder 132. NTSC encoder 132 encodes the input R, G, B video signals and composite synchronous signal and outputs a composite video signal to radio frequency modulator 136.

Similarly, if the user selects the DOWN key, microprocessor unit MPU 108 outputs the alphanumeric ASCII code in reverse sequential order to CGA controller 126, so that the alphanumeric ASCII code can be sequentially displayed in reverse order. CGA controller 126 outputs a video signal for allowing alphanumeric characters to be displayed in reverse sequential order to NTSC encoder 132. As a result, the user can input and define the user defined number and device names by means of the numeric keys and the UP and DOWN keys.

When the user inputs the control code, the house code and unit code by means of the numeric keys and the UP and DOWN keys in the manner described above, after completion of the user defined number and device names, microprocessor unit MPU 108 stores the codes in its internal temporary storage region and simultaneously enables their input to NTSC encoder 132 in the same manner as described above.

NTSC encoder 132 encodes the user defined number output from CGA controller 126, and the R, G, B video signals and the composite synchronous signal corresponding to the name of the device and outputs an encoded signal as a composite video signal to radio frequency RF modulator 136. NTSC encoder 132 may be used with a one-chip type of circuit.

Radio frequency RF modulator 136 connected to NTSC encoder 132 responds to fifth enable signal TVCS output from microprocessor unit MPU 108 and cuts off the output of antenna 134. Furthermore, radio frequency RF modulator 136 modulates the output of NTSC encoder 132 as a signal of a preset channel band and transmits the modulated signal to the tuner of television TV 138 connected to the output terminal of radio frequency RF modulator 136. Therefore, assuming that a predetermined channel is selected on television TV 138, a display message having a form as shown in FIG. 6 is displayed on television TV 138.

Under the above mentioned state, if the "*" key on remote controller 122 is input to the input terminal of microprocessor unit MPU 108 through infrared IR receiver 124, microprocessor unit MPU 108 detects input of the "*" key in step 514 of FIG. 5. Then, in step 526, microprocessor unit MPU 108 accesses data output from video RAM 128 and displayed on television TV 138 from its internal temporary storage region, and stores the data in RAM 120. In other words, if a storing key signal is input, microprocessor unit MPU 108 outputs an address to decoder 118 for generating fourth enable signal RAMCS and simultaneously outputs a write control signal. Microprocessor unit MPU 108 accesses data stored in the internal temporary storage region and supplies the address signal corresponding to the user defined number to random access memory RAM 120. Simultaneously, microprocessor unit MPU 108 outputs the data stored in the temporary storage region through data bus 106. Random access memory RAM 120 is operated at this time by fourth enable signal RAMCS output from decoder 118 that decodes the address signal corresponding to the user defined number. Random access memory RAM 120 stores the data input to data bus 106 in the address output from microprocessor unit MPU 108, under control of the write control signal.

It is accordingly appreciated that the user defined number, the name of device, the control code, the house code and the unit code of a corresponding power line controller PLC module can be displayed on television TV 138 and simultaneously stored in random access memory RAM 120.

Although setting of the user defined number can be done using the numeric keys, the process may also be performed using function keys. When function keys are used, there is an advantage in that one or more appliances can be controlled sequentially.

Referring now to FIG. 7, if the names of at least two or more devices, operating actions, and delay times are defined, in correspondence with a particular function key, information regarding the key is displayed on television TV 138 and stored in random access memory RAM 120. The unit of delay time refers to "seconds". FIG. 7 shows an exemplary display when the user presses the function key "F1". In this example, the porch light is turned off first, then after 10 seconds the window is opened, and finally, after 20 seconds a mixer is operated.

As discussed above, there are advantages of the present invention in that a user can select a user defined number and further define names of devices corresponding to the appliances and the house code and unit code corresponding to power line control PLC modules, thus making it easy to control the operation of appliances. A control operation of the appliances connected to the power line controller PLC modules, using the user defined number and functions, will now be explained in detail.

If the user selects a preset user defined number using the numeric keys or other keys on remote controller 122, an infrared IR signal corresponding to the defined number is output from remote controller 122. Infrared IR receiver 124 receives and demodulates the infrared IR signal output from remote controller 122 and supplies the demodulated signal to microprocessor unit MPU 108.

Microprocessor unit MPU 108 analyzes the received signal, and if the received signal corresponds to the user defined number or a function key, microprocessor unit MPU 108 outputs an address corresponding to the received signal to random access memory RAM 120 and decoder 118 simultaneously outputs a read control signal. Decoder 118 decodes the address input to random access memory RAM 120 and outputs fourth enable signal RAMCS. Thus, the RAM 120 is enabled by the input of the fourth enable signal RAMCS. The enabled random access memory RAM 120 transmits the read control signal, the house code and unit code stored in the address region corresponding to the user defined number, to a power line controller PLC transmitting/receiving circuit 140.

Power line controller PLC transmitting/receiving circuit 140 performs amplitude shift keying ASK modulation on the house code and unit code to transmit an amplitude shift key ASK modulated signal to a power line controller PLC interface 142. Then, power line controller PLC interface 142 outputs the amplitude shift key ASK modulated signal to alternating current AC power source line 144. Power line controller PLC modules 146 and 146$n$+1, which are connected in parallel to alternating current AC power source line 144, receive the amplitude shift key ASK modulated signal from alternating current AC power source line 144. After reception, power line controller PLC modules 146 and 146n+1 demodulate the amplitude shift key ASK modulated signal to generate a digital signal and detect whether the demodulated house code and unit code are consistent with their own inherent house and unit codes. In this case, the power line controller PLC module corresponding to the demodulated codes transmits a response signal to microprocessor unit MPU 108 through power line controller PLC interface 142 and simultaneously enables an alternating current AC power source to be turned on or off in correspondence with a received control code. For example, when the control code indicates an ON state, the power line controller PLC module supplies power from alternating power AC power source line 144 to the appliances, while if the control code indicates an OFF state, the power line controller PLC module turns off the power supplied to the appliances.

As shown in FIG. 7, if the function key defining operation for one or more appliances is selected, microprocessor unit MPU 108 sequentially transmits to power line controller PLC transmitting/receiving circuit 140, the house code, unit code and control code for turning the porch light off, opening the window and operating the mixer, at predetermined times. The power line controller PLC modules among the plurality of power line controller PLC modules 146 and 146n+1 having corresponding house codes and unit codes respond to the transmitted codes and are operated accordingly.

Therefore, by setting user defined functions, power line controller PLC modules 146 and 146n+1 corresponding to the devices established by the user defined number are controlled.

As is apparent from the foregoing, the present invention is advantageous for providing easy control of a home automation system HAS by controlling the operation of electrical appliances connected to the system through power line controller PLC modules. Using text and codes defined by the user, one can easily control the electrical appliances connected to the power line controller PLC modules.

What is claimed is:

1. A home automation system having a user controlled definition function and operated in response to input of a call code, said system including power line controller modules each for switching power to an appliance in response to receipt of a control code and variable visual display means for displaying input video information, said home automation system comprising:

video display processing means having a font memory and a video memory, for assessing font data received from said font memory corresponding to a character code in response to receipt of said character code and providing a video signal corresponding to assessed font data to said variable visual display means;

control means for providing to said video display processing means said character code input as alphanumeric characters corresponding to a user defined number, a name of said appliance, said call code and said control code in response to a user defined function mode, said control means storing said name of said appliance, said call code and said control code in a storage region having an address corresponding to said user defined number, and transmitting said call code and said control code to interfacing means in response to input of said user defined number; and said interfacing means for transmitting said call code and said control code output from said control means to said power line controller modules.

2. The home automation system as claimed in claim 1, further comprising:

abnormal state sensing means for scanning outputs of one or more sensors, and generating a system code, a channel code and a secret code indicative of a sensed abnormal occurrence when a security signal from said one or more sensors is detected; and warning signal generating means for generating an audible signal in response to said sensed abnormal occurrence.

3. The home automation system as claimed in claim 2, wherein said control means further comprises warning means for providing to said warning signal generating means a warning signal corresponding to said sensed abnormal occurrence detected by said abnormal state sensing means.

4. The home automation system as claimed in claim 1, further comprising input means for providing the input of said alphanumeric characters to said control means, said input means comprising a remote controller.

5. A home automation system for controlling operation of a plurality of appliances each connected to a respective one of a plurality of power line controller modules, said system comprising:

input means for entering an alphanumeric name of one of said plurality of appliances to be controlled, a house code representative of a household corresponding to said one of said plurality of appliances to be controlled, a unit code representative of one of said plurality of power line controller modules to be controlled, a control code representative of one of an ON and OFF function of said one of said plurality of appliances to be controlled and a user defined number representative of a memory address where said alphanumeric name, said house code, said unit code and said control code are stored after entry;

controller means for providing character code corresponding to said user defined number, said alphanumeric name, said house code, said unit code and said control code to video display processing means, said video display processing means for accessing font data received from a font memory corresponding to said character code in response to receipt of said character code and providing a video signal corresponding to accessed font data to variable visual display means; and interfacing means for receiving said house code, said unit code and said control code from said controller means, and transmitting said house code, said unit code and said control code to said plurality of power line controller modules to enable control of said one of said plurality of appliances in response to input of said user defined number.

6. The home automation system as claimed in claim 5, wherein said input means comprises a remote controller for providing alphanumeric inputs to said controller means.

7. The home automation system as claimed in claim 6, further comprised of said input means for sequentially entering said alphanumeric name, said house code, said unit code, said control code and a delay factor for each one of said plurality of appliances to be controlled, said delay factor indicative of a time when control over a corresponding one of said plurality of appliances is commenced; and said controller means for enabling sequential operation of each said one of said plurality of appliances to be controlled in dependence upon said house code, said unit code, said control code and said delay factor for each said one of said plurality of appliances to be controlled.

8. The home automation system as claimed in claim 7, further comprising:

abnormal state sensing means for scanning outputs of sensors for said plurality of appliances, and generating a system code, a channel code and a secret code indicative of a sensed abnormal occurrence when a security signal from said sensors is detected; and warning signal generating means for generating an audible signal in response to said sensed abnormal occurrence.

9. The home automation system as claimed in claim 8, wherein said control means further comprises warning means for providing to said warning signal generating means a warning signal corresponding to said sensed abnormal occurrence detected by said abnormal state sensing means.

10. The home automation system as claimed in claim 5, further comprised of said input means for entering said alphanumeric name, said house code, said unit code, said control code and a delay factor for each one of said plurality of appliances to be controlled, said delay factor indicative of a time when control over a corresponding one of said plurality of appliances is commenced; and said controller means for enabling sequential operation of each said one of said plurality of appliances to be controlled in dependence upon said house code, said unit code, said control code and said delay factor for each said one of said plurality of appliances to be controlled.

11. The home automation system as claimed in claim 5, further comprising:

abnormal state sensing means for scanning outputs of sensors for said plurality of appliances, and generating a system code, a channel code and a secret code indicative of a sensed abnormal occurrence when a security signal from said sensors is detected; and warning signal generating means for generating an audible signal in response to said sensed abnormal occurrence.

12. The home automation system as claimed in claim 11, wherein said control means further comprises warning means for providing to said warning signal generating means a warning signal corresponding to said sensed abnormal occurrence detected by said abnormal state sensing means.

13. A method for controlling a home automation system having input means for entering key data, variable visual display means for displaying said key data, control means for controlling operation of said system, a plurality of appliances and a corresponding plurality of power line controller modules, said method comprising the steps of:

entering for one of said plurality of appliances, via said input means, a user defined number, an alphanumeric designation representative of a user defined name for said one of said plurality of appliances, a control code representative of one of an ON function and an OFF function of said one of said plurality of appliances, a house code representative of a household corresponding to said one of said plurality of appliances, and a unit code representative of one of said plurality of power line controller modules corresponding to said one of said plurality of appliances;

displaying, on said variable visual display means, said user defined number, said alphanumeric designation, said control code, said house code and said unit code for said one of said plurality of appliances;

storing said alphanumeric designation, said control code, said house code and said unit code in a memory address represented by said user defined number in response to entry of a data storage key;

transmitting said house code, said unit code and said control code to said one of said plurality of power line controller modules in response to input of said user defined number; and performing one of said ON and OFF functions of said one of said plurality of appliances in dependence upon said control code.

14. The method as claimed in claim 13, further comprising the steps of:

scanning outputs of sensors for said plurality of appliances, and generating a system code, a channel code and a secret code indicative of a sensed abnormal occurrence when a security signal from said sensors is detected; and generating an audible signal to alert the user in response to said sensed abnormal occurrence.

* * * * *

UNITED STATES PATENT AND TRADEMARK OFFICE
CERTIFICATE OF CORRECTION

PATENT NO. : 5,579,221
DATED : November 26, 1996
INVENTOR(S) : Yong-Soon MUN

It is certified that error appears in the above-indentified patent and that said Letters Patent is hereby corrected as shown below:

Column 2, Line 60, after "the", change "User" to --user--;

Column 5, Line 18, after "RIGHT", change "()" to --(▷)--; and after "LEFT", change "()" to --(◁)--;

Column 5, Line 31, after "FIG. 3", change "while-" to --while--;

Column 9, Line 23, before "by", change "names" to --name--; and

Column 9, Line 28, after "device", change "names" to --name--:

Signed and Sealed this

Eighth Day of July, 1997

*Attest:*

BRUCE LEHMAN

*Attesting Officer*     *Commissioner of Patents and Trademarks*